Feb. 27, 1940.                R. S. SANFORD                2,192,018
                         CLUTCH CONTROL MECHANISM
                           Filed Dec. 1, 1932
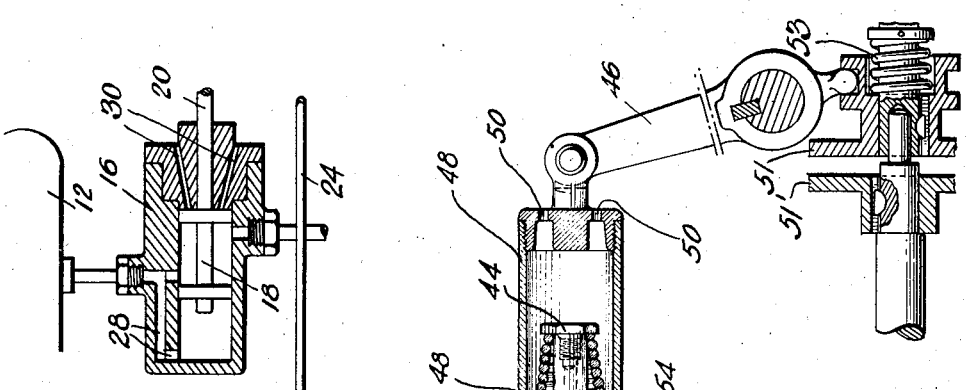
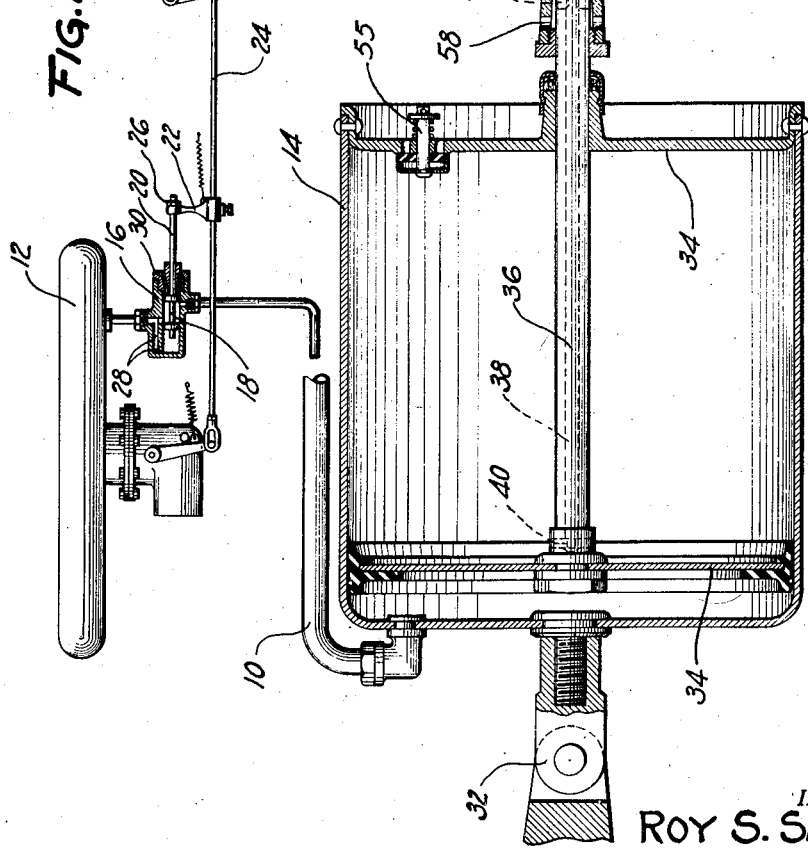
INVENTOR.
ROY S. SANFORD
BY McConkey & Smith
ATTORNEYS.

Patented Feb. 27, 1940

2,192,018

UNITED STATES PATENT OFFICE 2,192,018

CLUTCH CONTROL MECHANISM

Roy S. Sanford, South Bend, Ind., assignor to Bendix Aviation Corporation, South Bend, Ind., a corporation of Delaware Application December 1, 1932, Serial No. 645,298

4 Claims. (Cl. 192—.01)

This invention relates to clutch actuating mechanism for automotive vehicles and relates particularly to vacuum operated power means for disengaging the clutch.

An object of the invention is to insure the desired smooth uniform engagement of the clutch at all times regardless of the wear of the clutch plates.

More specifically, an object of the invention is to provide a coupling between a booster mechanism and a clutch actuating arm which functions as an integral unit during the major portion of the clutch actuating stroke, and which operates both as a bleed valve and coupling for the booster cylinder as soon as the clutch plates have become engaged.

Various other objects and meritorious features of the invention will be apparent from the following description taken in conjunction with the drawing wherein:

Figure 1 is a diagrammatic illustration of the accelerator control for the booster mechanism, Figure 2 is a sectional elevation through the booster cylinder and its coupling with the clutch actuating arm; and Figure 3 is an enlarged sectional view of the control valve of Figure 1.

Referring now to the drawing, a vacuum line 10 extends from an intake manifold 12 of a conventional internal-combustion engine (not shown) to a booster cylinder 14, an accelerator controlled valve 16 being incorporated in said line to control the operation of the booster. The control valve 16 is of a type described in detail in certain of my copending applications and comprises a cylinder casing in which a spool valve 18 is slidable, said valve having a stem 20 secured thereto and extending rearwardly through the casing. The same stem extends through an enlarged opening in a bracket 22 which is secured to the accelerator rod 24, an enlarged head 26 providing a one-way coupling between the bracket and the valve: 25 indicates a conventional type of accelerator pedal.

A by-pass 28 permits the forward part of the valve casing to be evacuated. In Figure 1 the valve is illustrated in accelerator released position, the spool valve 18 being held in its rearward position and providing direct communication through the vacuum line 10 to the booster cylinder 14. Depression of the accelerator will move the rod 24 forwardly, releasing the spool valve 18 for movement in a forward direction and the atmospheric pressure will operate through vents 30 in the valve casing to move the spool valve forward, cutting off the vacuum from the booster cylinder and admitting atmosphere to the booster to effect an engagement of the clutch.

The booster cylinder may be of any preferred construction and should be secured to some fixed portion of the vehicle chassis, as indicated by the pivotal connection at 32. A piston 34 is slidable within the cylinder and secured thereto is a piston stem 36 which extends out from the cylinder a substantial distance when the piston is at its forward limit of movement. The said stem 36 is axially bored as at 38, which bore communicates with spaced apart transverse apertures 40 and 42. The extreme outer end of the stem is provided with an enlarged head 44, which may be threaded in position as indicated in the drawing.

Pivotally secured to a clutch actuating arm 46 is a valve casing 48 which is vented to the atmosphere at one extremity by means of vents 50. The arm 46 is connected in the usual manner to a driven clutch member 51 which is normally urged into engagement with a driving clutch member 51' by a spring 53 commonly arranged as shown. These members are shown diagrammatically in Fig. 2 of the drawing. This valve casing is crimped in as at 52 to provide a shoulder adapted to function as a seat for one end of coil spring 54, the other end of said spring seating against the enlarged head 44 positioned at the extremity of the piston stem. The forward end of the valve casing 48 represents somewhat a tapered bottle neck 56, adjacent the outer extremity of which are a plurality of air vents 58.

As illustrated, the stem 36 is slidable through the bottle neck portion of the valve casing and the transverse aperture 42 is adapted to register substantially with the vents 58 when the piston 34 has reached its limit of movement to the left. The vented tapered neck 56 together with the apertured stem 36 constitute a bleed valve structure operable to control the clutch engaging operation of the booster as described in detail hereinafter.

An important feature of this combination resides in the fact that the coil spring 54 is substantially weaker than the conventional clutch spring 53 which normally tend to hold the clutch discs in engagement. When the accelerator pedal is released and the booster cylinder is in communication with the evacuated intake manifold through the line 10, the piston 34 will move to the left without carrying the valve casing 48 along with it until the coil spring 54 has substantially reached the limit of its yield, at which time the said casing 48 will be picked up and draw with it the clutch actuating arm 46 to disengage the clutch. A check valve 55 in one end wall of the booster 14 is provided to insure the clutch disengaging leftward movement of the piston 34 by admitting atmosphere to the right compartment of the booster.

Upon depression of the accelerator pedal 25 communication between the manifold and the booster cylinder will be cut off through the valve 16 and the forward end of the cylinder will be vented to air as hitherto explained. As the piston 34 moves to the right the air in the cylinder will escape through the aperture 40 along the axial bore 38 of the stem to the rear aperture 42, and thence out the vents 58 in the valve casing. The coil spring 54 being weaker than the clutch spring, the piston stem 36 and the valve casing 48 will move as a unit relatively rapidly until the clutch plates touch one another, at which time the piston stem 36 will begin to move to the right with respect to the valve casing 48 and the escape of air through the vents 58 will be gradually closed off as the transverse aperture 42 in the stem approaches the base of the tapered bottle neck 56. In this way a cushion or relatively slow clutch engaging action is secured immediately after the clutch plates have contacted one another with a predetermined load, and it will be apparent that this action will take place regardless of the wear on the clutch plates and the consequent extent of movement of the valve and stem coupling prior to reaching that point. The relative strength of the clutch spring 53 and valve spring 54 determines the aforementioned loading of the clutch and therefore the time of initiation of the aforementioned cushioning or bleed valve action.

It will therefore be seen that the coupling between the clutch actuating arm 46 and the vacuum booster mechanism constitutes a bleed valve which provides a cushioning effect for the reengagement of the clutch plates as soon as the tension in the spring 54 is relieved by the initial contact of the clutch plates. It is this automatic wear compensating cushion effect which constitutes the gist of this invention, and while a certain preferred structure has been illustrated, various modifications will be readily apparent to those skilled in the art and for that reason I wish to limit myself only within the scope of the appended claims.

I claim:

1. In combination with a spring operated clutch mechanism, a clutch controlling booster cylinder having a piston slidable therein, a stem secured to said piston and extending through one end of the cylinder, transverse passages extending into said stem adjacent the piston and at a distance therefrom greater than the length of said cylinder, an axial bore through said stem communicating with said passages, an apertured casing member telescopingly mounted on said stem at one end thereof and constituting therewith a bleed valve mechanism, yieldable means providing a series connection between said stem and casing member, and means interconnecting said casing with the clutch mechanism to be operated.

2. In an automotive vehicle provided with a clutch and with means biasing said clutch to closed position, means comprising a suction chamber for disengaging said clutch, and means rendered effective by initial contact of the clutch elements during clutch reengaging movement to oppose the clutch engaging effort of the biasing means, said last named means comprising a fluid compression chamber.

3. In a motor vehicle, the combination of a clutch, an arm for operating said clutch, a fluid motor having a closed chamber on each side of its operable element, a tubular rod connecting the motor with the arm and providing communication between one of the chambers of the motor and the atmosphere, and a spring biased valve for closing the communication through the tubular rod, said valve being held in open position by relative movement between the rod and arm when the clutch is disengaged and closed by its spring upon contact of the clutch faces when the clutch is permitted to engage.

4. In a motor vehicle, the combination of a clutch, a clutch controlling device comprising a cylinder and a piston reciprocable therein, said cylinder being closed to form a suction chamber at one side of the piston and a compression chamber at the opposite side, a clutch operating element, a tubular rod connected to the piston at one end and having the other end connected to the clutch operating element, a spring compressed by the actuation of the rod to disengage the clutch, said tubular rod providing communication between the compression chamber of the cylinder and the atmosphere when said spring is compressed, and a valve controlled by said spring and operating to close the communication between the compression chamber and the atmosphere when the spring is permitted to expand during reengagement of the clutch.

ROY S. SANFORD.